(12) United States Patent
Jung et al.

(10) Patent No.: US 8,599,686 B2
(45) Date of Patent: Dec. 3, 2013

(54) USER EQUIPMENT AND BASE STATION IN CARRIER AGGREGATION SYSTEM, AND CALL ADMISSION CONTROL METHOD FOR USE WITH THE USER EQUIPMENT AND BASE STATION

(75) Inventors: Kwang-Ryul Jung, Daejeon-si (KR); Soon-Yong Lim, Daejeon-si (KR); Ae-Soon Park, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 382 days.

(21) Appl. No.: 12/919,910

(22) PCT Filed: Oct. 30, 2009

(86) PCT No.: PCT/KR2009/006361
§ 371 (c)(1),
(2), (4) Date: Aug. 27, 2010

(87) PCT Pub. No.: WO2010/074401
PCT Pub. Date: Jul. 1, 2010

(65) Prior Publication Data
US 2011/0038280 A1   Feb. 17, 2011

(30) Foreign Application Priority Data
Dec. 22, 2008  (KR) .......................... 10-2008-0131692

(51) Int. Cl.
H04W 28/02 (2009.01)
H04W 76/02 (2009.01)
H04L 12/26 (2006.01)
H04J 3/06 (2006.01)

(52) U.S. Cl.
USPC ........ 370/230; 370/329; 370/350; 370/395.2; 455/67.11; 455/450; 455/509

(58) Field of Classification Search
USPC ............ 370/230, 329, 350, 395.2; 455/67.11, 455/450, 509
See application file for complete search history.

(56) References Cited

U.S. PATENT DOCUMENTS 7,782,899 B2    8/2010 Chen et al.
7,961,700 B2 *  6/2011 Malladi et al. ................ 370/345
(Continued)

FOREIGN PATENT DOCUMENTS

EP      1871035 A1 * 12/2007
KR   1020050024085      3/2005
(Continued)

OTHER PUBLICATIONS

CMCC, "Multicarrier Operation and PDCCH design of Carrier Aggregation," 3GPP TSG RAN WG1 meeting #55, R1-084333 (2008).

(Continued)

*Primary Examiner* — Alpus H Hsu
(74) *Attorney, Agent, or Firm* — Nelson Mullins Riley & Scarborough LLP; Anthony A. Laurentano, Esq.; John S. Curran, Esq.

(57) ABSTRACT

User equipment and a base station in a carrier aggregation system, and a call admission method thereof are discussed. The user equipment includes multiple physical layers, and the base station provides multiple component carriers. When messages for connection setup are transmitted and received between the user equipment and base station, the messages may include information about what component carriers are selected for the physical layers, information about what component carriers are selectable for the physical layers, information about calculations for uplink timing alignment. Call admission control and load balancing may be performed based on the information included in the messages. Accordingly, a carrier aggregation system providing call admission and load balancing is achieved.

3 Claims, 8 Drawing Sheets

(56) References Cited

U.S. PATENT DOCUMENTS

| | | | |
|---|---|---|---|
| 8,125,948 | B2 | 2/2012 | Kim |
| 2005/0053029 | A1 | 3/2005 | Lee et al. |
| 2006/0034204 | A1 | 2/2006 | Lee et al. |
| 2008/0212556 | A1 | 9/2008 | Heo et al. |
| 2008/0232316 | A1 | 9/2008 | Cho et al. |
| 2008/0233964 | A1* | 9/2008 | McCoy et al. ............... 455/450 |
| 2010/0067498 | A1* | 3/2010 | Lee et al. .................... 370/336 |
| 2010/0118720 | A1* | 5/2010 | Gauvreau et al. ........... 370/252 |
| 2010/0130218 | A1* | 5/2010 | Zhang et al. ................ 455/450 |
| 2010/0195522 | A1* | 8/2010 | Lee et al. .................... 370/252 |
| 2010/0227569 | A1* | 9/2010 | Bala et al. ..................... 455/73 |
| 2010/0240372 | A1* | 9/2010 | Wu ............................... 455/436 |
| 2010/0285809 | A1* | 11/2010 | Lindstrom et al. .......... 455/450 |
| 2010/0302964 | A1* | 12/2010 | Guo ............................. 370/252 |
| 2011/0003555 | A1* | 1/2011 | Guo ........................... 455/67.11 |
| 2011/0013581 | A1* | 1/2011 | Lee et al. .................... 370/329 |
| 2011/0075629 | A1* | 3/2011 | Seo et al. .................... 370/330 |
| 2011/0098074 | A1* | 4/2011 | Seo et al. .................... 455/509 |
| 2011/0122794 | A1* | 5/2011 | Kim et al. ................... 370/252 |
| 2011/0142009 | A1* | 6/2011 | Lindoff et al. .............. 370/332 |
| 2011/0235609 | A1* | 9/2011 | Ahn et al. ................... 370/329 |
| 2011/0261714 | A1* | 10/2011 | Pan et al. .................... 370/252 |
| 2011/0268032 | A1* | 11/2011 | Kim et al. ................... 370/328 |
| 2012/0147830 | A1* | 6/2012 | Lohr et al. .................. 370/329 |
| 2012/0218987 | A1* | 8/2012 | Zhao et al. .................. 370/350 |

FOREIGN PATENT DOCUMENTS

| | | |
|---|---|---|
| KR | 1020070074892 | 7/2007 |
| KR | 1020080065523 | 7/2008 |
| KR | 1020080085991 | 9/2008 |
| KR | 1020080100197 | 11/2008 |
| WO | 99/41933 A1 | 8/1999 |
| WO | 2007/017807 A1 | 2/2007 |
| WO | 2008/024788 A2 | 2/2008 |

OTHER PUBLICATIONS

LG Electronics, "Initial Access Procedure in LTE-Advanced," 3GPP TSG RAN WG1 Meeting #55, R1-084196 (2008).

LG Electronics, "Proposals and issues on the carrier aggregation and control signaling for LTE-A," 3GPP TSG RAN WG1 #55, R1-084194 (2008).

NTT DoCoMo, "Initial Access Procedure for Asymmetric Wider Bandwidth in LTE-Advanced," 3GPP TSG RAN WG1 Meeting #54bis, R1-083680 (2008).

International Search Report and Written Opinion for Application No. PCT/KR2009/006361, dated Jul. 7, 2011.

* cited by examiner

<Control Plane-Alt.A>

Fig. 6

<Control Plane-Alt.B>

USER EQUIPMENT AND BASE STATION IN CARRIER AGGREGATION SYSTEM, AND CALL ADMISSION CONTROL METHOD FOR USE WITH THE USER EQUIPMENT AND BASE STATION

RELATED APPLICATIONS

This application is a 35 U.S.C. §371 national stage filing of PCT Application No. PCT/KR2009/006361 filed on Oct. 30, 2009, which claims priority to, and the benefit of, Korean Patent Application No. 10-2008-0131692 filed on Dec. 22, 2008. The contents of the aforementioned applications are hereby incorporated by reference.

TECHNICAL FIELD

The following description relates to a wireless communication system, and more particularly, to a call admission control method which is used in a carrier aggregation system.

BACKGROUND ART

An existing 3GPP LTE system provides high-speed mobile communication services each having a maximum bandwidth of 20 MHz. However, with the recent diversity of service types, transmission speeds, etc., higher-speed mobile communication systems are becoming required more often.

In order to meet such requirements, an IMT-advanced communication system has been introduced which supports a wider bandwidth (maximum 100 MHz) than existing 3GPP LTE Release-8. Carriers for mobile communication generally have a contiguous spectrum, but recently, carriers having non-contiguous spectrums are required to implement complicated functions of ITU-based user equipments (UEs). With this, requirements for reuse of carriers that are used in existing mobile communication systems are also increasing. It is possible that a spread spectrum of 20 MHz or more could be made through carrier aggregation (CA) which is a kind of communication technique for bandwidth spreading. In CA, through integration of component carriers (CCs), a wider carrier band may be ensured, and since each CC may appear as a LTE carrier to the LTE UE, compatibility with existing systems may be ensured.

However, since existing mobile communication services do not consider such non-contiguous bands, they cannot provide efficient communication methods that use non-contiguous bands of component carriers.

Also, in order for user equipment to receive a service, it is necessary to select a cell, to maintain downlink timing alignment and to establish and maintain uplink timing alignment through random access. If the user equipment accesses non-contiguous carrier sets, the operations should be performed for each CC. In this case, a case may occur where traffic congestion occurs in some CCs and enough traffic remains in other CCs. Accordingly, a base station is needed to perform call admission control (CAC) and load balancing (LB) for efficient use of resources between CCs.

DISCLOSURE OF INVENTION

Technical Problem

The following description relates to a call admission control method which is performed by a system which uses non-contiguous bands of multiple component carriers, and user equipment and a base station using the call admission control method.

Technical Solution

In one general aspect, there is provided user equipment in a carrier aggregation system which provides multiple component carriers, the user equipment including: a connection setup requesting unit to transmit a connection setup request message including information about one or more physical layers for communication with the respective component carriers; and a connection establishing unit to receive a response to the connection setup request message and to change component carriers selected by the physical layers to other component carriers or establish uplink timing alignment between the component carriers selected by the physical layers, based on the response to the connection setup request message.

Also, the information about the physical layers may include information about the number of the physical layers or information about the component carriers selected by the physical layers.

The connection setup requesting unit designates a physical layer of the physical layers as a primary physical layer, and transmits the connection setup request message using a random preamble of a component carrier selected by the primary physical layer.

The connection setup requesting unit designates a physical layer of the physical layers as a primary physical layer, and the connection establishing unit, when receiving a connection setup rejection message, controls the primary physical layer to select another component carrier.

In another general aspect, there is provided a base station in a carrier aggregation system which provides multiple component carriers, the base station including a call admission unit to receive a connection setup request message from user equipment, and to transmit a connection setup admission message or a connection setup rejection message, including additional information, depending on whether each component carrier fulfills the requirements of the user equipment.

The additional information includes at least one piece of information about what component carriers are selectable by physical layers included in the user equipment, information about calculations for uplink timing alignment between the component carriers, or information about a dedicated preamble of each component carrier.

When a component carrier selected by a primary physical layer which is one of a plurality of physical layers included in the user equipment does not fulfill the requirements of the user equipment, the call admission unit transmits, to the user equipment, a connection setup rejection message including information about selectable component carriers in order to allow the primary physical layer to select another component carrier.

When all component carriers selected by a plurality of physical layers included in the user equipment fulfill the requirements of the user equipment, the call admission unit transmits, to the user equipment, a connection setup admission message including information about calculations for uplink timing alignment or information about dedicated preambles of the respective component carriers.

When a component carrier selected by a primary physical layer which is one among a plurality of physical layers included in the user equipment fulfills the requirements of the user equipment but component carriers selected by the remaining physical layers except for the primary physical layer do not fulfill the requirements of the user equipment, the call admission unit transmits, to the user equipment, a connection setup admission message including information about what component carriers are selectable by the remaining physical layers, information about calculations for uplink timing alignment between the component carriers selectable by the remaining physical layers and the component carrier selected by the primary physical layer, or information about dedicated preambles of the respective component carriers.

When additional allocation of a component carrier is needed after connection setup is completed, the call admission unit transmits information about another component carrier to the user equipment.

In another general aspect, there is provided a call admission control method which is performed in a carrier aggregation system where user equipment having a plurality of physical layers and a base station providing multiple component carriers are placed, the method including: designating, at the user equipment, a physical layer of the plurality of physical layers as a primary physical layer, and transmitting a connection setup request message including information about the number of the physical layers and information about component carriers selected by the individual physical layers, to the base station, through the primary physical layer; receiving, at the base station, the connection setup request message and determining whether a component carrier selected by the primary physical layer fulfills the requirements of the user equipment; when the component carrier selected by the primary physical layer does not fulfill the requirements of the user equipment, transmitting, at the base station, a connection setup rejection message including information about at least one selectable component carrier, to the user equipment, in order to allow the primary physical layer to select another component carrier; when the component carrier selected by the primary physical layer fulfills the requirements of the user equipment, transmitting, at the base station, a connection setup admission message including information about calculations for uplink timing alignment between the component carriers selected by the primary physical layer and component carriers selected by the remaining physical layers except for the primary physical layer, or information about a dedicated preamble of each component carrier, to the user equipment; when the user equipment receives the connection setup rejection message, changing, at the user equipment, the component carrier selected by the primary physical layer to another component carrier and retransmitting a connection setup request message to the base station; and when the user equipment receives the connection setup admission message, establishing, at the user equipment, uplink timing alignment between the component carriers selected by the individual physical layers.

Also, when additional allocation of component carriers are needed after connection setup is completed only using a physical layer, information for the additional allocation of the component carriers is transmitted and connection with the remaining physical layers is performed based on a response to the transmitted information.

Other objects, features and advantages will be apparent from the following description, the drawings, and the claims.

ADVANTAGEOUS EFFECTS

According to the above-described aspects, since each component carrier element (CCE) requests call admission using a selected CC while receiving and transmitting additional information, such as CCE information, CC information, etc., efficient call admission control (CAC) and load balancing (LB) are achieved.

BRIEF DESCRIPTION OF DRAWINGS

Elements, features, and structures are denoted by the same reference numerals throughout the drawings and the detailed description, and the size and proportions of some elements may be exaggerated in the drawings for clarity and convenience.

MODE FOR THE INVENTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
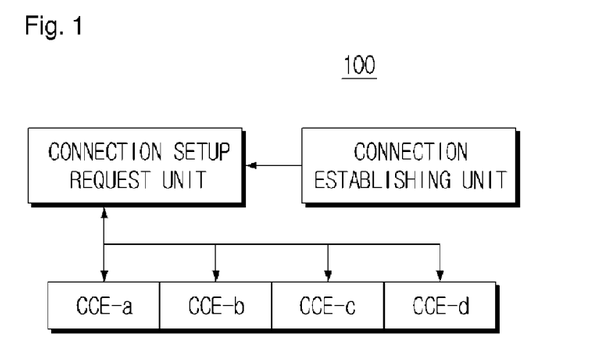
FIG. 1 is a block diagram illustrating a configuration of user equipment according to an exemplary embodiment.

FIG. 1 is a block diagram illustrating a configuration of user equipment 100 according to an exemplary embodiment.

Referring to FIG. 1, the user equipment 100 has a plurality of physical layers 101 (that is, CCE-a through CCE-d) identified from each other, a connection setup requesting unit 102 which requests a connection to a base station, and a connection establishing unit 103 which establishes a connection with the base station according to a message received from the base station.

The physical layers 101 seek a cell which allows connections with the user equipment 100 and receive a system information block (SIB) of any found cell. The physical layers 101, that is, CCE-a through CCE-d, select different component carriers (CCs) provided by the base station, and are individually focused on the corresponding CCs. Hereinafter, for convenience of description, each physical layer 101 will be referred to as 'CCE (Component Carrier Element)' and each component carrier provided by the base station will be referred to as 'CC (Component Carrier)'.

The connection setup requesting unit 102 creates a connection setup request message and transmits it to the base station. The connection setup request message may include information about the number of the CCEs 101, information about what CC is selected by each CCE 101, etc. The connection setup request message may be transmitted by a primary CCE of the CCEs 101.

The connection establishing unit 103 receives a connection setup admission message or a connection setup rejection message from the base station, and changes CCs selected by the CCEs 101 to other ones or establishes uplink timing alignment between CCs selected by the CCEs 101, based on additional information included in the connection setup admission message or the connection setup rejection message. The additional information may include information about what CCs fulfill the requirements of the user equipment 100, information about calculations for uplink timing alignment between the CCs, or information about a dedicated preamble for each CC.

Figure 2:
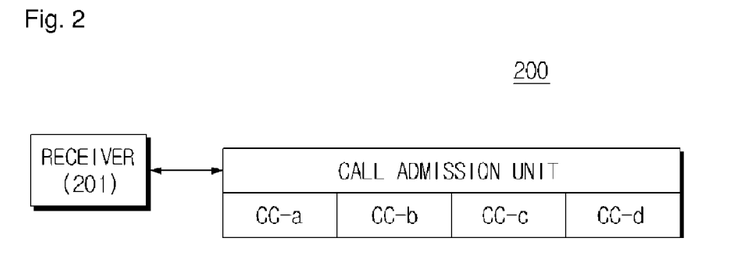
FIG. 2 is a block diagram illustrating a configuration of a base station according to an exemplary embodiment.

FIG. 2 is a block diagram illustrating a configuration of a base station 200 according to an exemplary embodiment.

Referring to FIG. 2, the base station 200, as described above with reference to FIG. 1, provides multiple CCs, that is, CC-a through CC-d. Also, the base station 200 includes a receiver 201 which receives a connection setup request message from the user equipment 100 (see FIG. 1), and a call admission unit 202 which decides call admission in response to the connection setup request message. The call admission unit 202 accepts or refuses the connection setup request from the user equipment according to allocation of radio resources, thereby performing load balancing.

In FIG. 2, the CCs may be selected by the CCEs of the user equipment 100. FIGS. 1 and 2 correspond to the case where user equipment has four CCEs and a base station provides four CCs. However, the numbers of CCEs and CCs are not limited to the embodiments of FIGS. 1 and 2 and also the number of CCEs may not be equal to that of the CCs.

For example, when the CCE-a of the user equipment 100 selects CC-a of the base station 200, the base station 200 determines whether the CC-a fulfills the requirements of the user equipment 100, creates a connection setup rejection message if the CC-a does not fulfill the requirements of the user equipment 100, and transmits the connection setup rejection message to the user equipment 100. At this time, by including, in the connection setup rejection message, a message indicating that CC-a is not available but CC-b is available, the user equipment 100 can move from the CC-a to CC-b and then a call admission procedure can be performed.

Meanwhile, if the CC-a fulfills the requirements of the user equipment 100, the base station 200 creates a connection setup admission message and transmits it to the user equipment 100. At this time, by including, in the connection setup admission message, information (for example, information about TA calculations or about dedicated preambles) for uplink timing alignment between the CC-a and the remaining CCs, uplink timing alignment may be achieved quickly.

Figure 3:
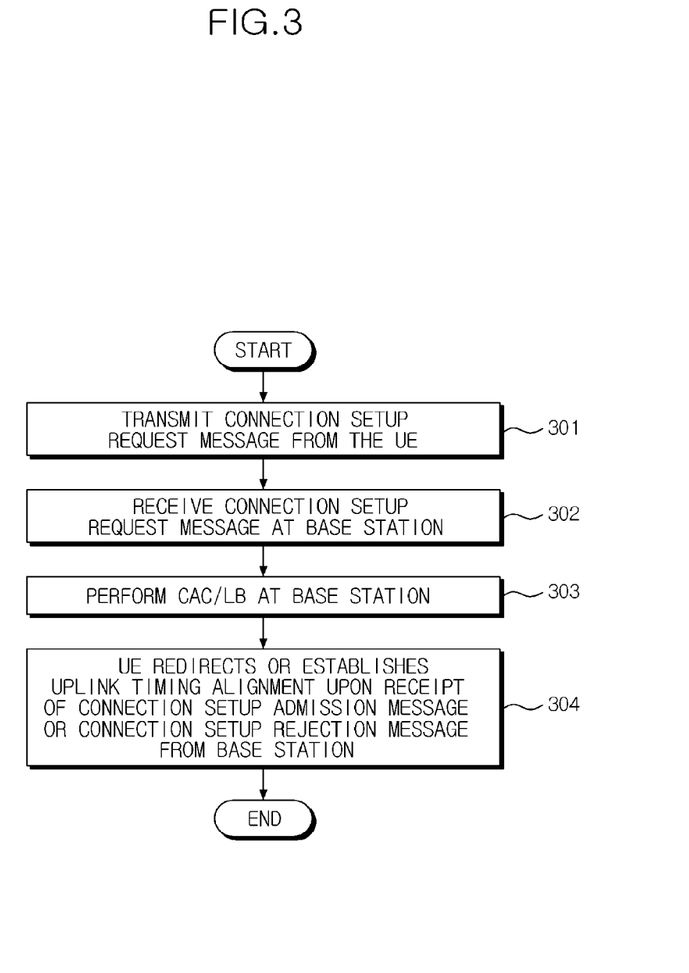
FIG. 3 is a flowchart illustrating a call admission control method according to an exemplary embodiment.

FIG. 3 is a flowchart illustrating a call admission control method according to an exemplary embodiment.

Referring to FIGS. 1, 2 and 3, the user equipment 100 transmits a connection setup request message to the base station 200 (operation 301). For example, the user equipment 100 designates any one of a plurality of CCEs as a primary CCE, selects a preamble from among a set of preambles of a CC selected by the primary CCE and gains random access to the base station 200 through the selected preamble. The user equipment 100 transmits a connection setup request message including information about the number of CCEs and information about CCs selected by the CCEs, to the base station 200, using an uplink resource allocated through the random access.

The base station 200 receives the connection setup request message (operation 302), and performs call admission control and load balancing (CAC/LB) (operation 303). For example, the base station 200 may determine whether the CC selected by the primary CCE of the user equipment 100 fulfills the requirements of the user equipment 100, and transmits a connection setup admission message or a connection setup rejection message to the user equipment 100 according to the result of the determination. The determination on whether the CC fulfils the requirements of the user equipment 100 may depend on a bearer of the user equipment 100, QoS, allocation of radio resources, etc. Also, the connection setup rejection message or connection setup admission message may include additional information, such as information about what CCs can be allocated to the CCE, information about calculations for uplink timing alignment, or information about a dedicated preamble of each CC, etc.

For example, a connection setup rejection message may include information about a dedicated preamble of another CC which can be allocated to a corresponding CCE, and a connection setup admission message may include information about timing alignment (TA) calculations for uplink timing alignment or information about a dedicated preamble of the corresponding CC.

The user equipment 100, after receiving the connection setup rejection message or connection setup admission message from the base station 200, changes the CC selected by the CCE into another CC or establishes uplink alignment between CCs selected by the CCEs, based on additional information included in the received message (operation 304).

For example, if the CC selected by the primary CCE does not fulfill the requirements of the user equipment 100, the base station 200 transmits a connection setup rejection message to the user equipment 100, and the user equipment 100 can select another CC which can be allocated to the CCE, using the additional information included in the connection setup rejection message.

Meanwhile, if the CC selected by the primary CCE fulfills the requirements of the user equipment 100, the base station 200 transmits a connection setup admission message to the user equipment 100, and the user equipment 100 quickly establishes uplink timing alignment between the CCs selected by the CCEs based on information about TA calculations and dedicated preambles included in the connection setup admission message.

The call admission procedure between the user equipment 100 and base station 200 will be described in more detail with reference to FIG. 4, below.

Figure 4:
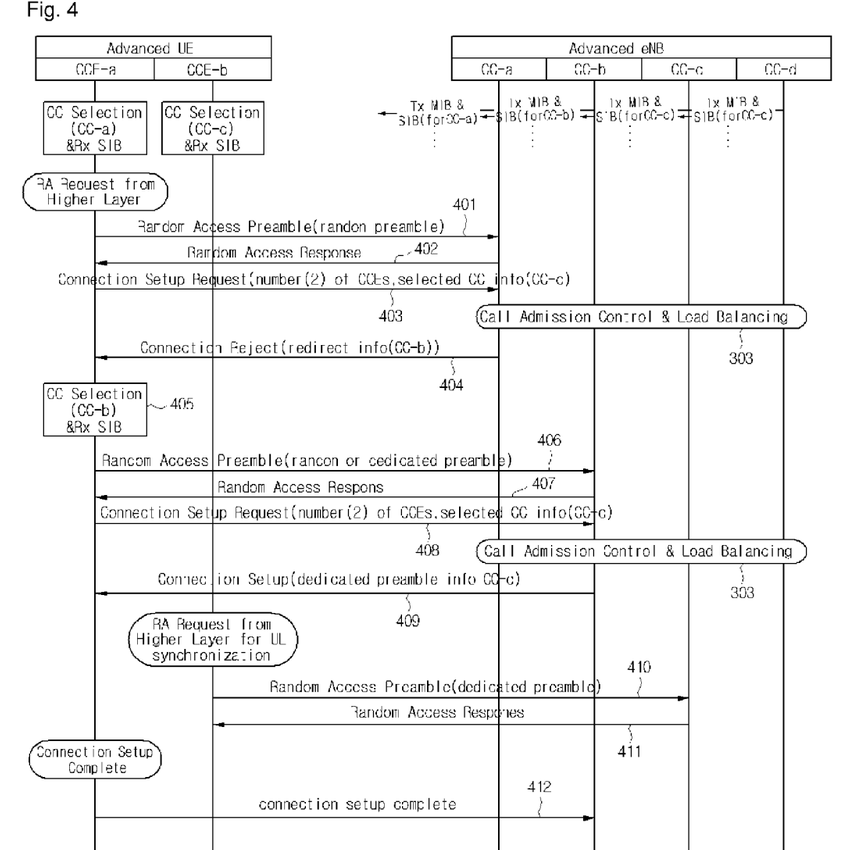
FIG. 4 is a flowchart illustrating a call admission control method according to another exemplary embodiment.

FIG. 4 is a flowchart illustrating a call admission control method between user equipment and base station, according to another exemplary embodiment. FIG. 4 relates to the case where a base station which manages four CCs, that is, CC-a, CC-b, CC-c and CC-d performs a call admission control procedure with user equipment which has two CCEs, that is, CCE-a and CCE-b.

In FIG. 4, the CCE-a selects the CC-a, and the CCE-b selects CC-c. Also, the user equipment designates the CCE-a as a primary CCE for performing an initial random access procedure to exchange messages associated with connection setup.

The user equipment transmits a random access preamble message to the base station through the CCE-a which is a primary CCE (operation 401). For example, the CCE-a may select a preamble from among a received set of preambles of the CC-a, and start a random access procedure with the CC-a using the selected preamble. If the selected preamble is available, the base station 200 transmits a random access response message to the user equipment (operation 402). The user equipment establishes uplink timing alignment using the random access response message, and is allocated an uplink resource through which a message for connection setup can be transmitted.

Thereafter, the user equipment transmits a connection setup request message to the base station using the uplink resource allocated through the random access procedure (operation 403). The connection setup request message may include information about the number of CCEs, information about what CC is selected by each CCE, etc.

The base station, after receiving the connection setup request message, performs CAC/LB (operation 303). That is, the base station determines whether the CC-a fulfills the requirements of the user equipment, and allows the user equipment to connect to the CC-a or causes the user terminal to migrate to another CC, according to the result of the determination.

For example, if the CC-a selected by the CCE-a which is a primary CCE cannot accept a bearer of the user equipment, the base station transfers a connection setup rejection message to the user equipment (operation 404). The connection setup rejection message may contain information about another CC selectable by the CCE-a. In the current embodiment, as the CC-a selected by the CCE-a does not have sufficient capacity, the connection setup rejection message including information about another CC, that is, CC-b is transmitted.

Accordingly, the user equipment changes the CC-a to the CC-b (operation 405), gains random access to the CC-b and then transmits a connection setup request message to the base station through the CC-b (operations 406, 407 and 408).

Then, the base station performs CAC/LB (operation 303), and transmits a connection setup admission message to the user equipment when the CC-c fulfils the requirements of the user equipment (operation 409). The connection setup admission message may contain information about a dedicated preamble of the CC-c. That is, the user equipment causes the remaining CCE-b to quickly gain random access to the CC-c using the dedicated preamble of the CC-c included in the connection setup admission message. Accordingly, the CCE-b establishes uplink timing alignment for the CC-c (operations 410 and 411).

When all the CCEs of the user equipment establish uplink timing alignment through random access, the user equipment transmits a connection setup completion message to the base station, thereby completing the call admission procedure (operation 412).

FIG. 4 shows only the case where the user equipment requires a CCE which has performed a random access procedure to change an initially selected CC to another CC. However, it is also possible that the user equipment requires changing CCs of all CCEs through CAC/LB.

Also, in FIG. 4, when the user equipment which has received a connection setup rejection message performs a CC redirection procedure, if a SIB transmitted by each CC of the base station includes information about all other CCs, a CC selection procedure only may be performed. If different SIBs are used for respective CCs, a random access procedure may be resumed after selecting a CC and receiving all SIBs.

Also, it is possible to include dedicated preamble information for another CCE of the user equipment in a connection setup admission message so as to enable the user equipment to quickly perform uplink timing alignment through random access, or to include, when timing alignment information of another CC of the user equipment can be calculated using uplink timing alignment information for specific CCs such as CCs using contiguous bands, the uplink timing alignment information (for example, information about TA calculations) in a connection setup admission message and thereby omit a random access procedure for establishing uplink timing alignment of the CCE.

Figure 11:
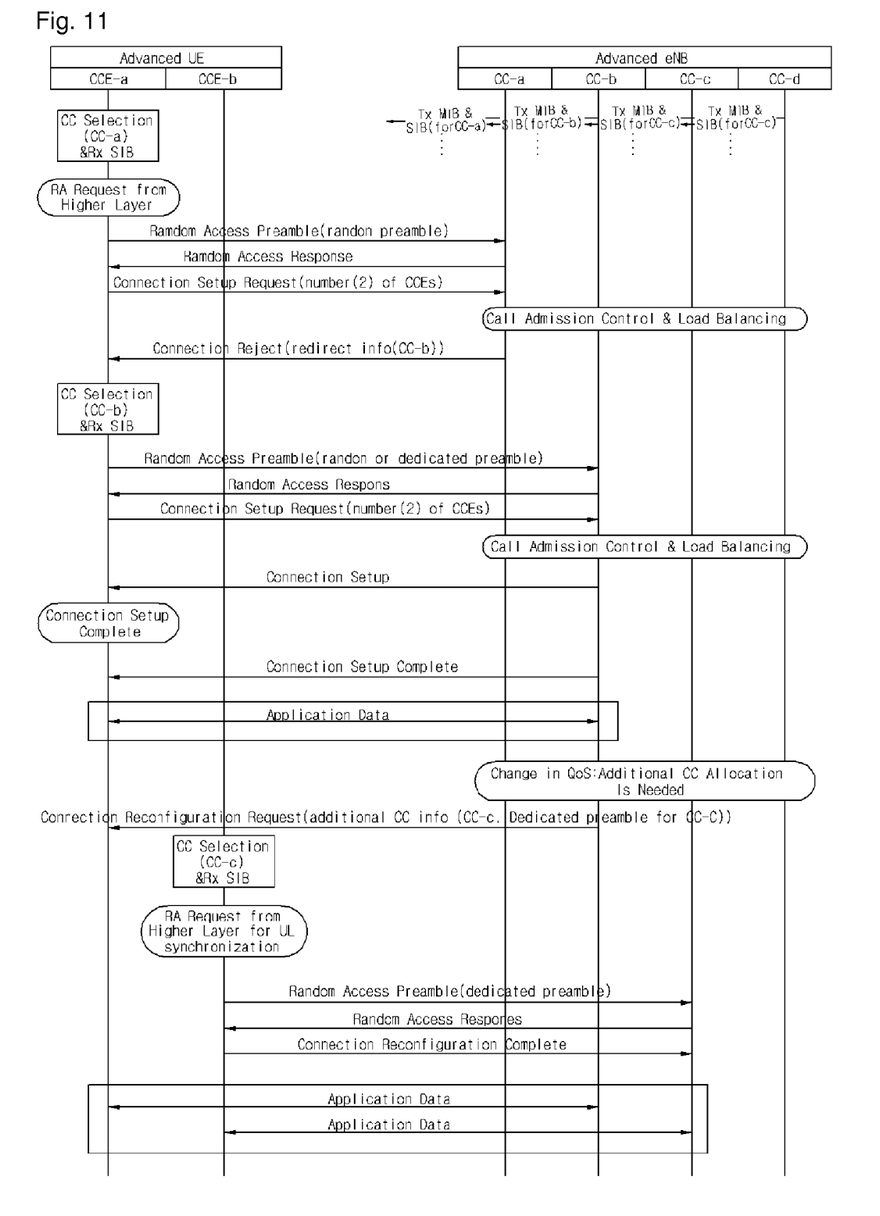
FIG. 11 is a flowchart illustrating a CAC method according to another exemplary embodiment.

Also, it is possible that when additional CC allocation is requested after connection setup is completed with a CCE, information for the additional CC allocation is received, and another CCE is allocated a new CC and then focused on the newly allocated CC (see FIG. 11).

Figure 5:
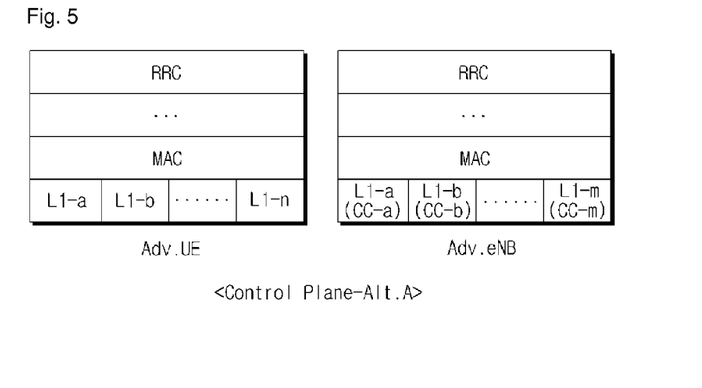
FIG. 5 shows a communication protocol stack according to an exemplary embodiment.
Figure 6:
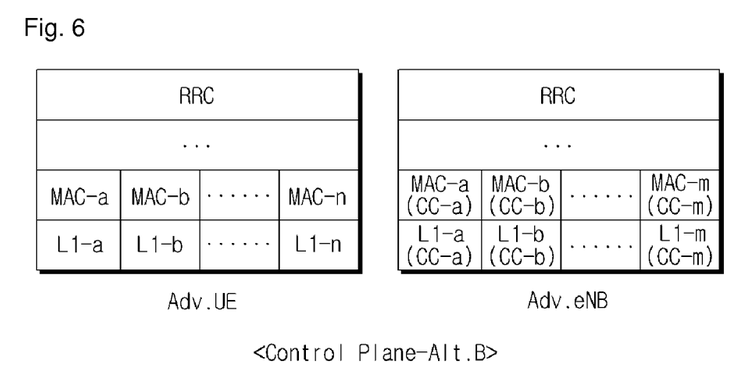
FIG. 6 shows a communication protocol stack according to another exemplary embodiment.

FIGS. 5 and 6 show communication protocol stacks between the user equipment 100 and the base station 200 according to exemplary embodiments.

Referring to FIGS. 5 and 6, a communication protocol is horizontally composed of a physical layer, a data link layer and a network layer, and vertically composed of a user plane for data information transmission and a control plane for signaling.

FIGS. 5 and 6 show control planes, wherein each control plane is divided into L1, L2 and L3 based on the lower three layers of an OSI model. A physical layer which belongs to the first layer among the lower three layers is used to provide an information transfer service through a physical channel, and corresponds to a CCE described above. A radio resource control (RRC) layer that is placed on the third layer functions to control radio resources between user equipment and a network.

The physical layer which is the first layer is connected with a Medium Access Control (MAC) layer which is the second layer, via a transport channel, so that data is transported between the MAC layer and the physical layer through the transport channel. Also, between different physical layers, that is, between the physical layers of a transmitting party and a receiving party, data is transported through a physical channel. The MAC layer of the second layer provides a service to a Radio Link Control (RLC) layer which is the upper layer, through a logical channel.

In the current embodiment, as illustrated in FIG. 5, a single MAC layer may control a plurality of first layers (that is, CCEs), or as illustrated in FIG. 6, a plurality of divided MAC layers may each control a corresponding CCE.

Figure 7:
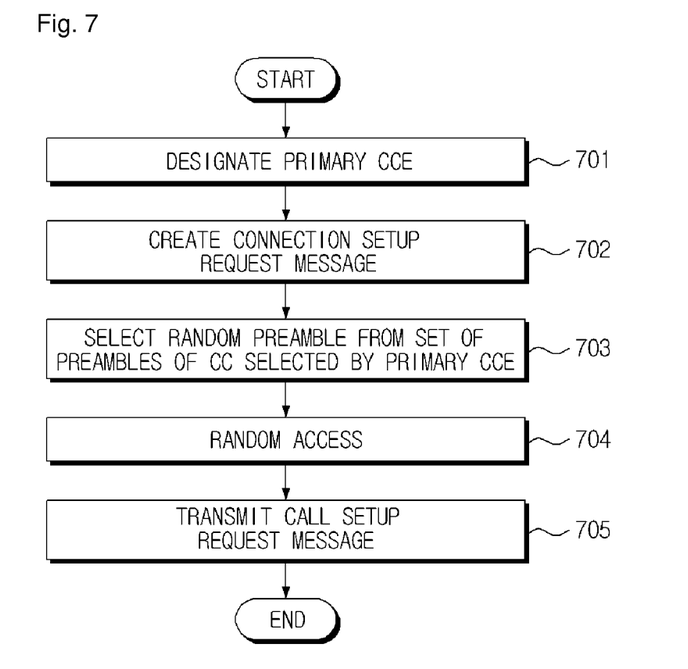
FIG. 7 is a flowchart illustrating a method by which the user equipment transmits a connection setup request message, according to an exemplary embodiment.

FIG. 7 is a flowchart illustrating a method by which the user equipment 100 (see FIG. 1) transmits a connection setup request message, according to an exemplary embodiment.

First, the user equipment 100 designates any one of a plurality of CCEs as a primary CCE (operation 701). The primary CCE, by which the user equipment 100 will perform a random access procedure, may be a CCE to be used mainly for call setup.

Then, a connection setup request message is created (operation 702). The connection setup request message may include information about the number of CCEs, information about CCs selected by the CCEs, etc. For example, as illustrated in FIG. 11, when a call setup procedure is performed using a CCE, the connection setup request message may include only information about the number of CCEs. In addition, information about a CC selected by the primary CCE may be not included in the connection setup request message.

Then, any one preamble among a set of preambles of the CC selected by the primary CCE is selected (operation 703) and a random access procedure is initiated using the selected preamble (operation 704).

Thereafter, the connection setup request message is transmitted to the base station 200 through an uplink resource allocated by the random access procedure (operation 705).

Figure 8:
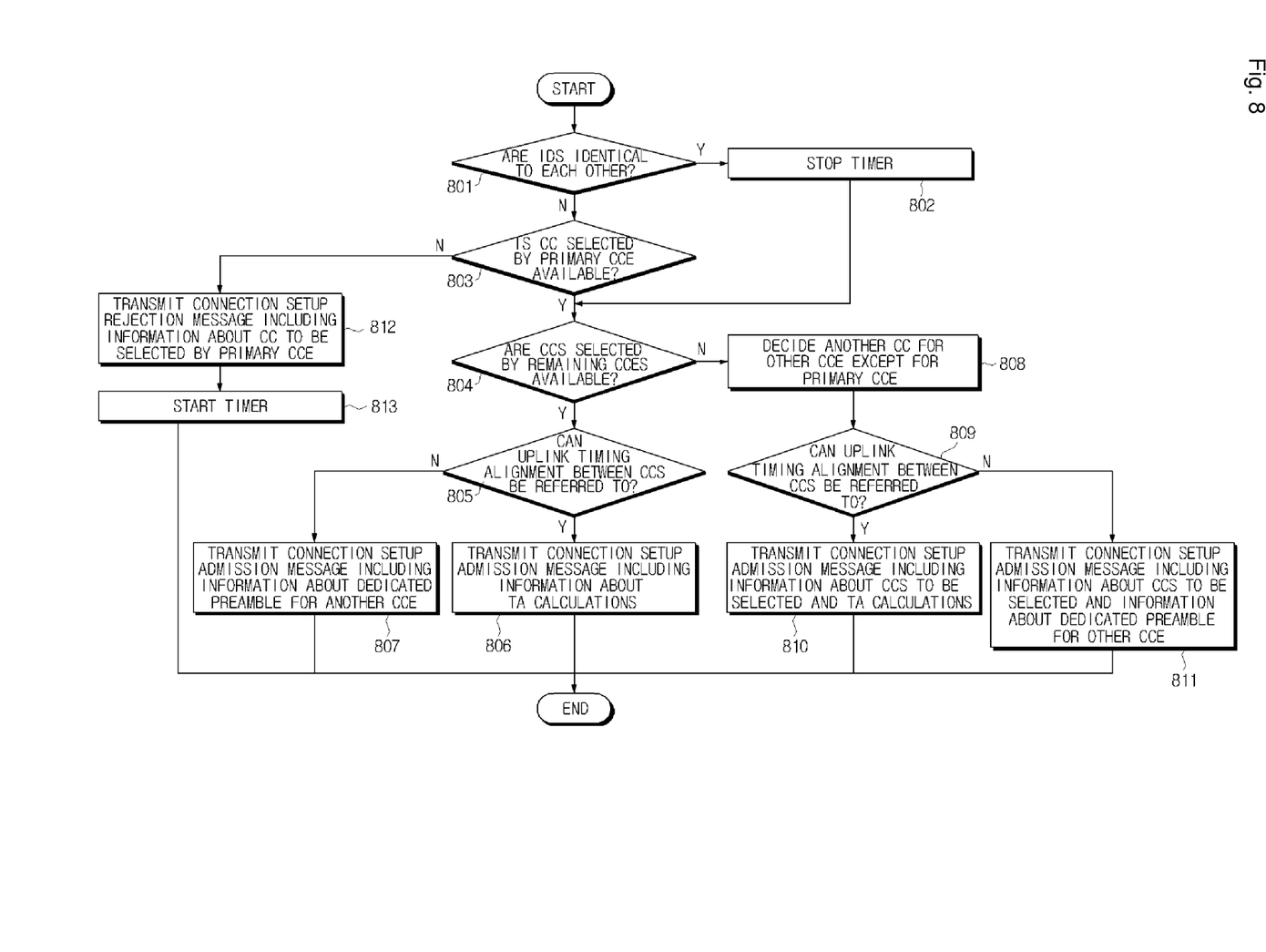
FIG. 8 is a flowchart illustrating a call admission control/load balancing (CAC/LB) procedure which is performed by the base station, according to an exemplary embodiment.

FIG. 8 is a flowchart illustrating a CAC/LB procedure which is performed by the base station 200 (see FIG. 2), according to an exemplary embodiment.

First, if a connection setup request message is received from the user equipment 100 (see FIG. 2), it is determined whether the user equipment's ID included in the connection setup request message is identical to an ID which the base station 200 has transmitted during previous CAC/LB (operation 801). The ID, which is compared with the user equipment's ID, may be used only while a timer is running which started when the base station has transmitted a connection setup rejection message.

If the user equipment's ID is identical to the ID, the timer is stopped (operation 802) and it is determined whether a CC (for example, CC-c) selected by another CCE except for a primary CCE is available (operation 804). The determination on whether the CC is available depends upon a default bearer of the user equipment 100 or upon whether the selected CC guarantees a QoS level required by the user equipment 100.

If all CCs selected by the primary CCE and the other CCE are available, it is determined whether uplink timing alignment information between the selected CCs can be referred (operation 805).

If uplink timing alignment information of a CC selected by the other CCE of the user equipment 100 can be calculated using uplink timing alignment information of the CC selected by the primary CCE, a connection setup admission message including information about TA calculations for the other CCE is transmitted to the user equipment 100 (operation 806). When the uplink timing alignment information of the CC selected by the other CCE of the user equipment cannot be referred to, a connection setup admission message including information about a dedicated preamble of the CC is transmitted to the user equipment 100 in order to rapidly perform a random access procedure for establishing uplink timing alignment of the CCE (operation 807).

In operation 804, if a CC selected by the primary CCE can fulfill the requirements of the user equipment 100 but the CC selected by the other CCE cannot fulfill the requirements of the user equipment 100, another CC is chosen for the other CCE (operation 808).

Then, it is determined whether uplink timing alignment information between the selected CCs can be referred to (operation 809).

If uplink timing alignment information of the CC selected by the other CCE of the user equipment 100 can be calculated using uplink timing alignment information of the CC selected by the primary CCE, a connection setup admission message including information about TA calculations for the other CCE and information about what CC is selected by the other CCE is transmitted to the user equipment 100 (operation 810). When no uplink timing alignment information can be referred to, a connection setup admission message including information about what CC is selected by the other CCE and information about a designated preamble of the CC to quickly perform a random access procedure for uplink timing alignment of the other CCE is transmitted to the user equipment 100 (operation 811).

If it is determined in operation 803 that the CC selected by the primary CCE can neither accept a bearer of the user equipment 100 nor satisfy a demanded QoS level, a connection setup rejection message including information indicating another CC that can be selected by the primary CCE of the user equipment 100 is created and transmitted to the user equipment 100 (operation 812), and then a timer is initiated for the waiting for a next connection setup request from the user equipment 100 (operation 813).

Figure 9:
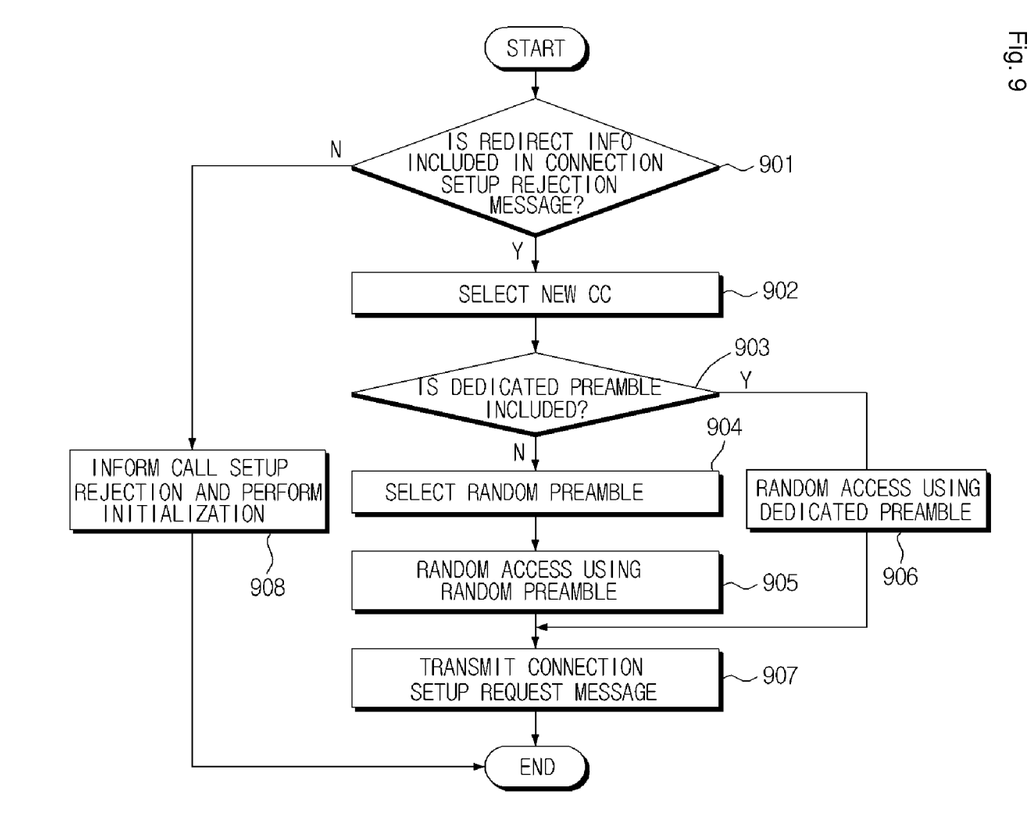
FIG. 9 is a flowchart illustrating the operation of the user equipment when receiving a connection setup rejection message, according to an exemplary embodiment.

FIG. 9 is a flowchart illustrating the operation of the user equipment 100 when receiving a connection setup rejection message, according to an exemplary embodiment.

When receiving a connection setup rejection message from the base station 200, the user equipment 100 determines whether Redirect Info is included in the connection setup rejection message (operation 901). The Redirect Info may be information indicating another CC to which the user equipment 100 will move when a CC cannot fulfill the requirements of the user equipment 100.

If Redirect Info is included in the connection setup rejection message, a new CC is selected according to the Redirect Info (operation 902). For example, referring to FIG. 4, when CC-a initially selected by CCE-a does not have sufficient capacity, the CC-a is rejected and information about CC-b having sufficient capacity is provided to the CCE-a such that the CCE-a can select the CC-b.

Then, it is determined whether a dedicated preamble is included in the connection setup rejection message (operation 903). Here, the dedicated preamble may be a dedicated preamble of a CC to which the user equipment 100 will move.

If no dedicated preamble is included in the received message, any one among a set of preambles of the newly selected CC is selected (operation 904), and random access is made using the selected preamble (operation 905).

If a dedicated preamble is included in the received message, random access is made using the dedicated preamble (operation 906).

If an uplink resource is allocated through the random access, a connection setup request message is again transmitted to the base station 200 (operation 907).

If it is determined in operation 901 that no Redirect Info is included in the connection setup rejection message, call setup rejection is given to the corresponding user equipment 100 and initialization is performed (operation 908).

Figure 10:
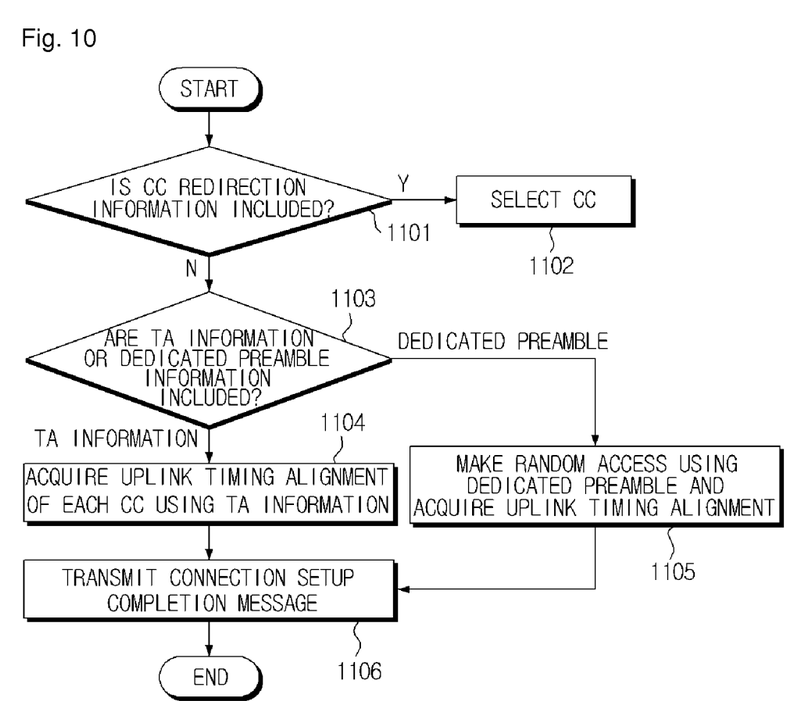
FIG. 10 is a flowchart illustrating the operation of the user equipment when receiving a connection setup admission message, according to an exemplary embodiment.

FIG. 10 is a flowchart illustrating the operation of the user equipment 100 when receiving a connection setup admission message, according to an exemplary embodiment.

The user equipment 100, which has received a connection setup admission message from the base station 200, determines whether information about a CC for any remaining CCE except for a primary CCE is included in the connection setup admission message (operation 1101).

If information about a CC for the remaining CCE is included in the connection setup admission message, the CC is selected (operation 1102).

If no information about a CC for the remaining CCE is included in the connection setup admission message, it is determined whether information about TA calculations or information about a designated preamble is included in the connection setup admission message (operation 1103).

If information about TA calculations is included in the connection setup admission message, uplink timing alignment for respective CCs is acquired using the information about the TA calculations (operation 1104).

If information about a dedicated preamble is included in the connection setup admission message, random access is performed using the dedicated preamble and uplink timing alignment for respective CCs is performed (operation 1105).

Then, the user equipment 100 transmits a connection setup complement message (operation 1106).

FIG. 11 is a flowchart illustrating a call admission control method which is performed between the user equipment 100 and the base station 200, according to another exemplary embodiment. FIG. 4 relates to the case where CCE-a and CCE-b both select CCs and then connection setup is performed, whereas FIG. 11 relates to the case where only one CCE selects a CC, and when additional CC allocation is needed, due to a change in demanded QoS level, etc., upon transmission or reception of application data after connection setup, CC allocation is performed and the remaining CCEs are focused on newly allocated CCs.

In the embodiment of FIG. 11, the connection setup request message may not include information about a CC selected by CCE-b. In this case, if additional CC allocation is needed, information (for example, dedicated preamble information or TA calculation information, etc.) about a corresponding CC is transmitted to the user equipment 100. Accordingly, the user equipment 100 is allocated another CC, that is, CC-c, through CCE-b which the user equipment 100 has never used, thus receiving and transmitting application data through the CC-c.

Therefore, according to the embodiments described above, an efficient access procedure can be provided in a system which uses non-contiguous bands of multiple component carriers.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

The invention claimed is:

1. A computing device-implemented method in which user equipment performs a call admission procedure in a carrier aggregation system which provides multiple component carriers, comprising:
    transmitting a connection setup request message for communication with the respective component carriers, to a base station; and
        receiving a connection setup admission message or a connection setup rejection message from the base station in response to the connection setup request message received at the base station, and, in the event of receiving the connection setup rejection message, changing component carriers selected by the user equipment to other component carriers, or, in the event of receiving the connection setup admission message, establishing uplink timing alignment between the component carriers selected by the user equipment,
    wherein the receiving of the connection setup rejection message includes:
        receiving the connection setup rejection message that includes information about the component carries that can be used by the user equipment, and
        changing a component carrier selected for a primary physical layer which is one among a plurality of physical layers included in the user equipment based on the information about the component carriers that can be used by the user equipment.

2. The method of claim 1, wherein the connection setup request message includes information about a number of the component carriers that can be used by the user equipment or information about what component carriers are selected by the user equipment.

3. A computing device-implemented method in which user equipment performs a call admission procedure in a carrier aggregation system which provides multiple component carriers, comprising:
    transmitting a connection setup request message for communication with the respective component carriers, to a base station; and
    receiving a connection setup admission message or a connection setup rejection message from the base station in response to the connection setup request message received at the base station, and, in the event of receiving the connection setup rejection message, changing component carriers selected by the user equipment to other component carriers, or, in the event of receiving the connection setup admission message, establishing uplink timing alignment between the component carriers selected by the user equipment,
    wherein the receiving of the connection setup admission message includes:
        receiving the connection setup admission message that includes information about calculations for uplink timing alignment or information about dedicated preambles of the respective component carriers, and
        establishing uplink timing alignment between the component carriers selected by the user equipment based on the information about calculations for uplink timing alignment or the information about dedicated preambles of the respective component carriers.

* * * * *